(12) United States Patent
Leung et al.

(10) Patent No.: US 12,198,145 B2
(45) Date of Patent: Jan. 14, 2025

(54) LOGISTICS MANAGEMENT SYSTEM AND METHOD USING BLOCKCHAIN

(71) Applicant: Hong Kong Applied Science and Technology Research Institute Company Limited, Hong Kong (HK)

(72) Inventors: Wai Kei Ricky Leung, Hong Kong (HK); Shing Yee Chu, Hong Kong (HK); Chi Keung Wong, Hong Kong (HK); Tsz Fung Leung, Hong Kong (HK); Samuel Chen Ying Ng, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 627 days.

(21) Appl. No.: 17/543,703

(22) Filed: Dec. 6, 2021

(65) Prior Publication Data
US 2023/0177521 A1 Jun. 8, 2023

(51) Int. Cl.
*G06Q 10/0832* (2023.01)
*G06F 16/27* (2019.01)
(Continued)

(52) U.S. Cl.
CPC ........... *G06Q 30/018* (2013.01); *G06F 16/27* (2019.01); *G06Q 10/0832* (2013.01); *G07C 9/00896* (2013.01); *G07C 2009/0092* (2013.01)

(58) Field of Classification Search
CPC ............. G06Q 10/0832; G06Q 10/083; G06Q 10/0833; G07C 2009/0092; G07C 9/00309; G07C 2009/00317
See application file for complete search history.

(56) References Cited

U.S. PATENT DOCUMENTS

| | | |
|---|---|---|
| 10,755,230 B2 | 8/2020 | Mehring et al. |
| 11,012,228 B2 | 5/2021 | Mercuri et al. |
| (Continued) | | |

FOREIGN PATENT DOCUMENTS

| | | |
|---|---|---|
| AU | 2018101016 A4 | 8/2018 |
| CN | 109087005 A | 12/2018 |
| (Continued) | | |

OTHER PUBLICATIONS

Green et al. "Blockchain Technology and Maritime Shipping: An Exploration of Use Cases in the U.S. Maritime Transportation Sector," U.S. Department of Transportation Maritime Administration, Jun. 2020, Retrieved from https://www.maritime.dot.gov/sites/marad.dot.gov/files/2020-07/Blockchain% (Year: 2020).*

(Continued)

*Primary Examiner* — Rupangini Singh
*Assistant Examiner* — Bryan J Kirk
(74) *Attorney, Agent, or Firm* — Idea Intellectual Limited; Margaret A. Burke; Sam T. Yip

(57) ABSTRACT

A computer-implemented method for compliance checking related to goods in import supply chain logistics is provided, including: adding received legality data elements into a blockchain ledger corresponding to an importation of the goods; establishing a smart contract of the blockchain ledger; adding received sensing data elements corresponding to the smart contract into the blockchain ledger; adding electronic lock (e-Lock) status data corresponding to the smart contract into the blockchain ledger; and adding one or more inspection results corresponding to the smart contract into the blockchain ledger. Furthermore, determining, by the smart contract, whether the goods are within the compliance according to the received legality data elements, the received sensing data elements, the e-Lock status data and the one or more inspection results, wherein in response to determining (Continued)

that the goods are within the compliance, unsealing the e-Locks by sending a control signal to the e-Locks.

12 Claims, 9 Drawing Sheets

(51) Int. Cl.
   *G06Q 30/018* (2023.01)
   *G07C 9/00* (2020.01)

(56) References Cited

U.S. PATENT DOCUMENTS

| | | | |
|---|---|---|---|
| 2018/0096175 A1* | 4/2018 | Schmeling | G06F 1/3206 |
| 2018/0144298 A1* | 5/2018 | Rankin | H04L 9/3247 |
| 2018/0285810 A1 | 10/2018 | Ramachandran et al. | |
| 2019/0080284 A1 | 3/2019 | Kim et al. | |
| 2019/0359400 A1* | 11/2019 | Pariente-Cohen | B65D 5/4212 |
| 2021/0083851 A1 | 3/2021 | Chamarajnager et al. | |

FOREIGN PATENT DOCUMENTS

| | | |
|---|---|---|
| CN | 111936994 A | 11/2020 |
| CN | 112613895 A | 4/2021 |
| CN | 112884451 A | 6/2021 |
| CN | 112967074 A | 6/2021 |
| JP | 2020030610 A | 2/2020 |

OTHER PUBLICATIONS

International Search Report and Written Opinion of corresponding PCT application No. PCT/CN2021/142778 mailed on Sep. 1, 2022.
Hyperledger Fabric v1.4 docs, "Ledger", https://hyperledger-fabric.readthedocs.io/en/release-1.4/ledger/ledger.html.
Shangru Wu et al., "Apparatus and Method of Lightweight Communication Protocols between Multiple Blockchains", U.S. Appl. No. 17/100,790, filed Nov. 20, 2020.

* cited by examiner

LOGISTICS MANAGEMENT SYSTEM AND METHOD USING BLOCKCHAIN

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to the field of logistics management system, and in particular, to logistics management system and method incorporating blockchain technology. More specifically, the present invention relates to techniques, devices, and systems for assuring regulatory compliance for goods in cross-border logistics using smart contracts in blockchains.

BACKGROUND OF THE INVENTION

The current cross-border logistics is inefficient as repeated inspections and documentation verifications are required at multiple checkpoints. Often, the delays, physical inspections, and container sealing and unsealing affect the quality of perishable and environment-sensitive goods. Current technologies fail to provide trusted data between cross-border regulators and other stakeholders to improve efficiency in the logistics. It is also difficult to apply continuous compliance tracking of perishable and environment-sensitive goods.

Therefore, there is a need for a system that can automatically record the trusted data (e.g., inspection results, import/export custom documents/forms for the cross-border logistics, etc.) related to goods in a cross-border logistic chain, while monitoring the conditions of the goods in real-time during the entire goods transportation, and facilitating automatic container unsealing/sealing when authorized conditions are triggered.

SUMMARY OF THE INVENTION

One objective of the present invention is to provide a logistic management system and method to record goods-related data by using blockchain and smart contract technologies to address the aforesaid shortcomings in the current state of the art.

In accordance to a first aspect of the present invention, a computer-implemented method for compliance checking related to goods in import supply chain logistics is provided. The method comprises: establishing one or more smart contracts of a blockchain, each smart contract corresponding to a type of goods in the import supply chain logistics, wherein each type of goods is associated with a set of compliance rules and parameters; and adding the received legality data elements related to the goods corresponding to an importation of the goods as blocks into a blockchain ledger, wherein the legality data elements are sent from one or more terminals of an importer or one or more import-related institutions. The method further comprises: selecting a smart contract among the established smart contracts of the blockchain ledger based on the type of the goods in the import supply chain logistics; and adding one or more received sensing data elements corresponding to the selected smart contract as one or more blocks into the blockchain ledger continuously, wherein the sensing data elements are generated by one or more sensors installed at one or more containers of the goods. The method further comprises: adding electronic lock (e-Lock) status data corresponding to the smart contract as one or more blocks into the blockchain ledger continuously, wherein the e-Lock status data is generated by e-Locks installed at the containers; and adding one or more inspection results corresponding to the smart contract as one or more blocks into the blockchain ledger when the inspection results are received from one or more authorized terminals.

Furthermore, in response to an execution condition of an assessment process is triggered, determining, by the selected smart contract, whether the goods are within the compliance parameters according to the received legality data elements, the received sensing data elements, the e-Lock status data and the inspection results, wherein in response to a determination of that the goods are within the compliance parameters, unsealing the e-Locks by sending a control signal to the e-Locks. In response to a determination of that the goods are not within the compliance parameters, sending a notification to at least one of the terminals of the importer and the import-related institutions without unsealing the e-Locks.

In accordance to a second aspect of the present invention, a logistic management system using blockchain technologies for compliance checking related to goods in import supply chain logistics is provided. The system comprises a management server and one or more containers. The management server includes a first storage circuit unit, a first data communication circuit and a first processor. The first processor is configured to manage one or more blockchain ledgers, and to control the first non-transient memory circuit and the first data communication circuit. Each of the containers includes one or more sensors installed at the container; one or more electronic locks (e-Locks) installed at one or more doors or lids of the container; a second storage circuit unit; a second data communication circuit; and a second processor. The sensors monitor various statuses of the container and goods therein. The e-Locks are configured to seal and unseal the doors or lids of the container. The second non-transient memory circuit is configured to preserve data generated by the sensors and e-Locks. The second data communication circuit is configured to establish a data communication network with the first data communication circuit of the management server. The second processor is configured to control the sensors, the one or more e-Locks, and the second data communication circuit. Furthermore, the first processor is further configured to access and execute machine instructions to implement a computer-implemented method in accordance to the aforementioned first aspect of the present invention.

BRIEF DESCRIPTION OF THE DRAWINGS

Embodiments of the invention are described in more details hereinafter with reference to the drawings, in which.

DETAILED DESCRIPTION

In the following description, systems and methods of logistic management for compliance checking related to goods in import supply chain logistics and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
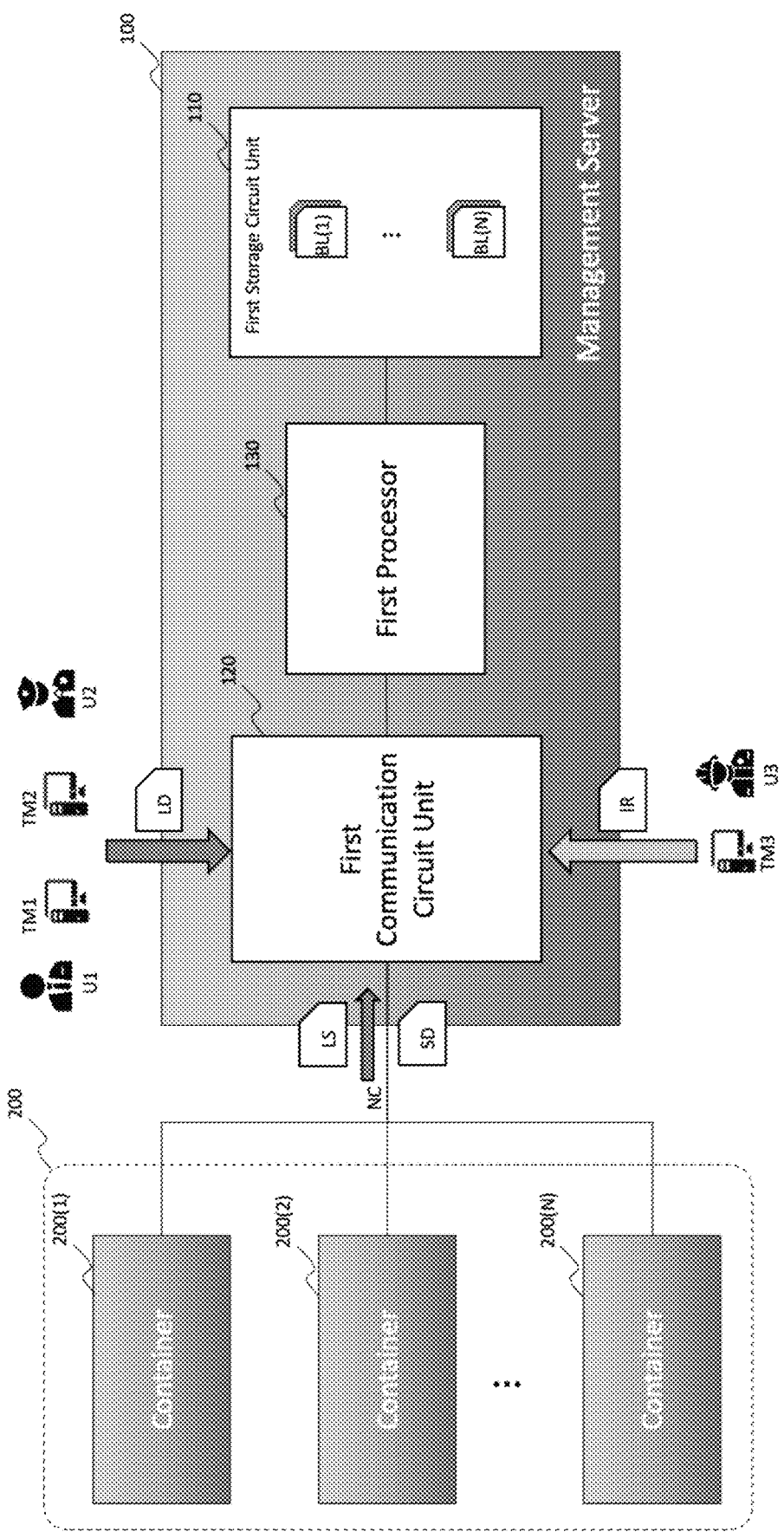
FIG. 1A depicts a block diagram illustrating a logistic management system in accordance with one embodiment of the present invention.

Referring to FIG. 1A, in accordance to one aspect of the present invention, a logistic management system 1 using blockchain for compliance checking related to goods in import supply chain logistics is provided. The logistic management system 1 includes a management server 100 and one or more containers 200 (e.g., containers 200(1) to 200(N)). During transport, goods are stored in the containers 200. The management server 100 includes a first non-transient memory circuit 110, a first data communication circuit 120 and a first processor 130. The first processor 130 is electrically coupled to the first non-transient memory circuit 110 and the first data communication circuit 120.

The first non-transient memory circuit 110 is configured to store data and machine instructions. The first processor 130 is configured to manage the blockchain ledgers BL(1) to BL(N) in the blockchain environment, and to control the first non-transient memory circuit 110 and the first data communication circuit 120.

Figure 1B:
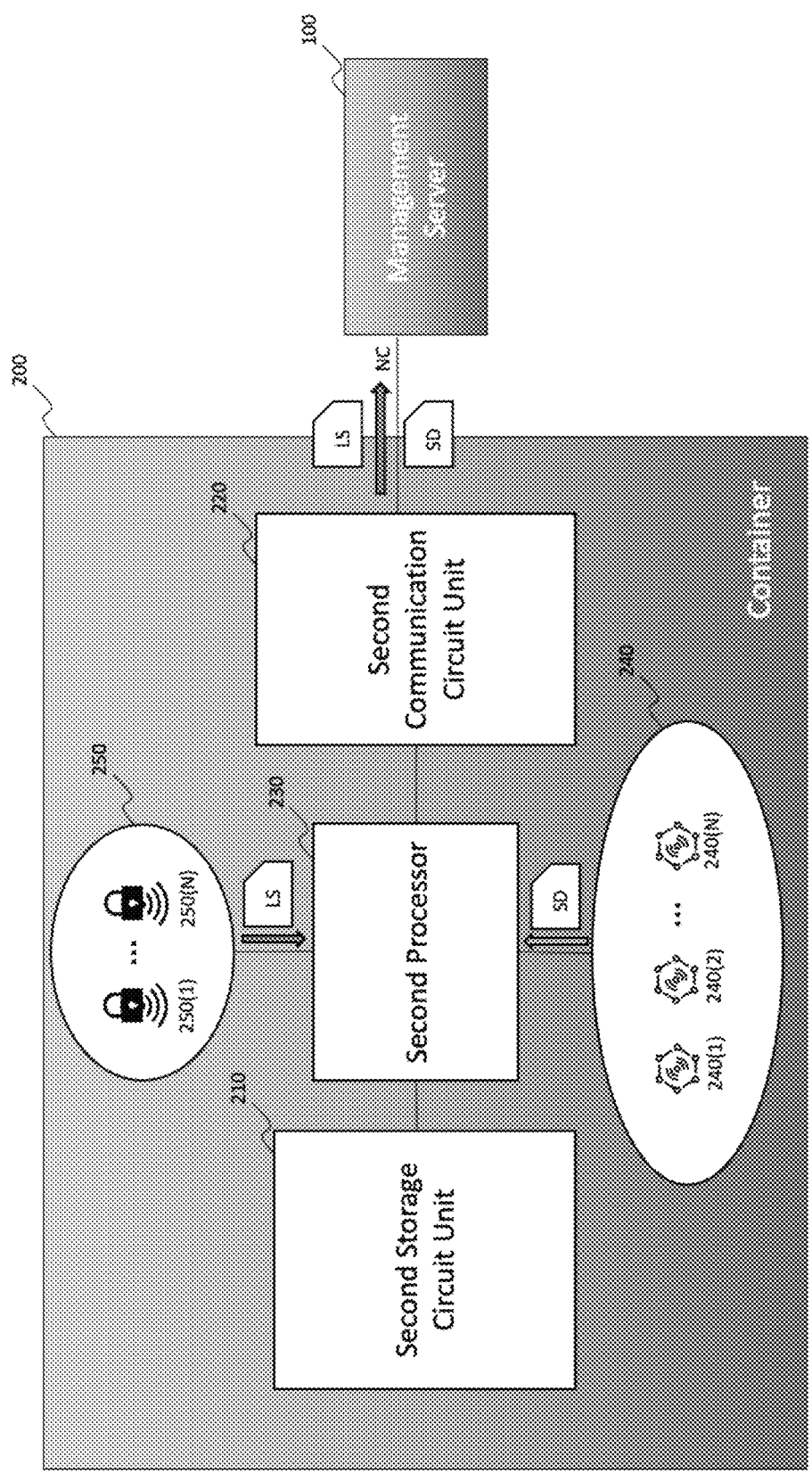
FIG. 1B depicts a block diagram illustrating a container (smart container) of the logistic management system.

Referring to FIG. 1B, each of the containers 200 includes sensors 240(1) to 240(N) installed at the container 200; one or more electronic locks (e-Locks) 250(1) to 250(N) installed at one or more doors of the container 200; a second non-transient memory circuit 210; a second data communication circuit 220; and a second processor 230. The second processor 230 is electrically coupled to the sensors 240, the e-Locks 250, the second non-transient memory circuit 210 and the second data communication circuit 220.

The sensors 240 monitor various conditions of the container and goods there within. More specifically, the container 200 is installed with different types of sensors 240 to sense at least one of the following types of conditions of the container and the goods there within in real-time: container internal temperature, air-pressure, humidity, and luminance; goods weight and temperature; container location, acceleration, and vibration. The sensed data are transferred to the second processor 230 for processing to generate the corresponding sensing data elements SD to be sent to the management server 100 via the network NC. The sensors comprise one or more of a thermometer, a pressure gauge, a hygrometer, an accelerometer, a vibration meter, a GPS receiver, an electronic weight scale, and a photo sensor.

The e-Locks 250 are configured to seal and unseal the doors of a container 200. In an embodiment, the second processor 230 instructs the e-Locks to seal or unseal the door(s) of the container, and the data on the status of the e-Locks (e.g., seal state or unseal state) is sent to the second processor 230 from the e-Locks to generate the e-Lock status data LS corresponding to each of the e-Locks 250. In another embodiment, the e-Locks 250 are operated upon locally (e.g., with an electronic mobile device that is configured to authenticate and authorize a user having proper authorization to wirelessly interact with the e-Locks 250) to seal and unseal. In a further embodiment, the e-Lock status data LS is generated by each of the e-Locks itself. The generated e-Lock status data LS and sensing data elements SD are sent to the management server 100 via network NC, and stored in the second non-transient memory circuit 210.

In one embodiment, the data structure of the e-Lock status data message/record includes one or more of following fields: (1) a first field for recording the identification of the e-Lock corresponding to the e-Lock status data; (2) a second field for recording the seal/unseal state of the e-Lock; (3) a third field for recording current local time of the e-Lock; (4) a forth field for recording the identification of a smart contract related to the e-Lock status data; (5) a fifth field for recording the legality data of the seal/unseal state in the second field; and (6) a sixth field for recording the location information of the e-Lock.

The second data communication circuit 220 is configured to establish a network NC with the first data communication circuit 120 of the management server 100. The second processor 230 is configured to control the sensors 240, the e-Locks 250, and the second data communication circuit 220. The first data communication circuit 120 may also establish network connections with other electronic devices (e.g., other users' computing devices (or terminal devices) TM1 to TM3), or to the Internet, such that the legality data elements LD and inspection result data IR may be transferred via the Internet between terminal devices TM1, TM2, and TM3.

In one embodiment, the terminal devices TM1, TM2, and TM3, and the management server 100 form a blockchain environment by serving as nodes with each hosting a copy of a blockchain ledger.

The blockchain is structured as sequential log of interlinked blocks stored in the blockchain ledger, where each block contains a sequence of transactions. Each block's header includes a cryptographic hash of all the transactions of the block and a copy of the equivalent hash of the prior block's header. This way, all blocks on the ledger are inextricably and immutably linked together. Thus, even if one node (e.g., the management server 100) hosting the ledger is tampered with, it cannot convince all the other nodes (e.g., terminal TM1 and TM2) that it has the 'correct' blockchain because the ledger is distributed throughout a network of independent nodes in the blockchain environment.

A smart contract in short is a set of customizable executable machine instructions that enforces a set of governance rules on a business object or transaction according to the data or transactions in the corresponding blockchain and contents or trigger-conditions of the smart contract.

Figure 2:
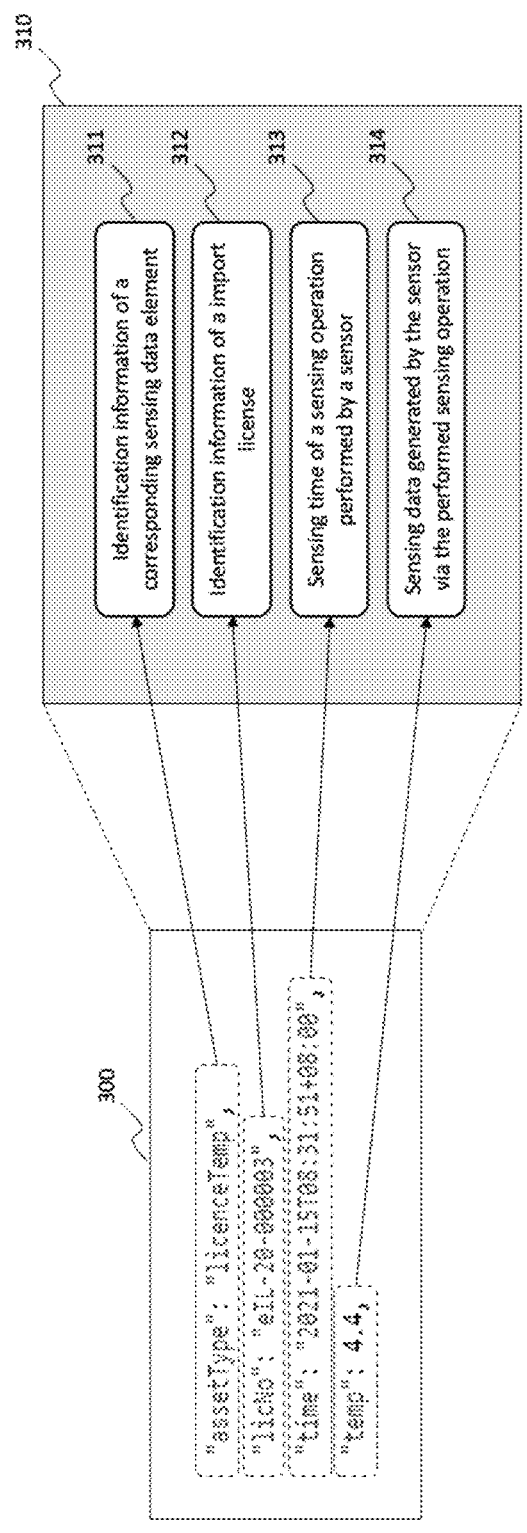
FIG. 2 illustrates a data structure of a sensing data element being sent to a management server of the logistic management system.

Referring to FIG. 2, taking a sensing data element 300 (e.g., real-time goods temperature data) as an example, the data structure 310 of the sensing data element 300 includes following fields:

(1) a first field 311 for recording identification information of a corresponding sensing data element; (2) a second field 312 for recording identification information of a logistic license (e.g., import license) corresponding to the goods; (3) a third field 313 for recording sensing time of a sensing operation performed by a sensor of the corresponding sensing data element; (4) a fourth field for recording a sensing data 314 generated by the sensor via the performed sensing operation. In one embodiment, the identification information of the license number is used for tracking a smart contract to which the corresponding sensing data element is related. For example, each of the established smart contract records the identification information of the import license (or logistic license) of the goods.

The management server 100 may, based on the first field of the sensing data element, identify a particular one of the criteria of the smart contract corresponding to the sensing data element; based on the second field, identify an established smart contract, which can use/access the sensing data element; based on the third field, identify the time at which the sensing data element is generated; based on the fourth field, determine whether the value of the sensing data violate identified one of the criteria of the related smart contract corresponding to the sensing data element.

In accordance to another aspect of the present invention, the first processor 130 is further configured to executes machine instructions stored in the first non-transient memory circuit 110 to implement a computer-implemented method of logistic management for compliance checking related to goods in import supply chain logistic by utilizing the blockchain ledgers in the blockchain environment and the smart contracts.

Figure 3:
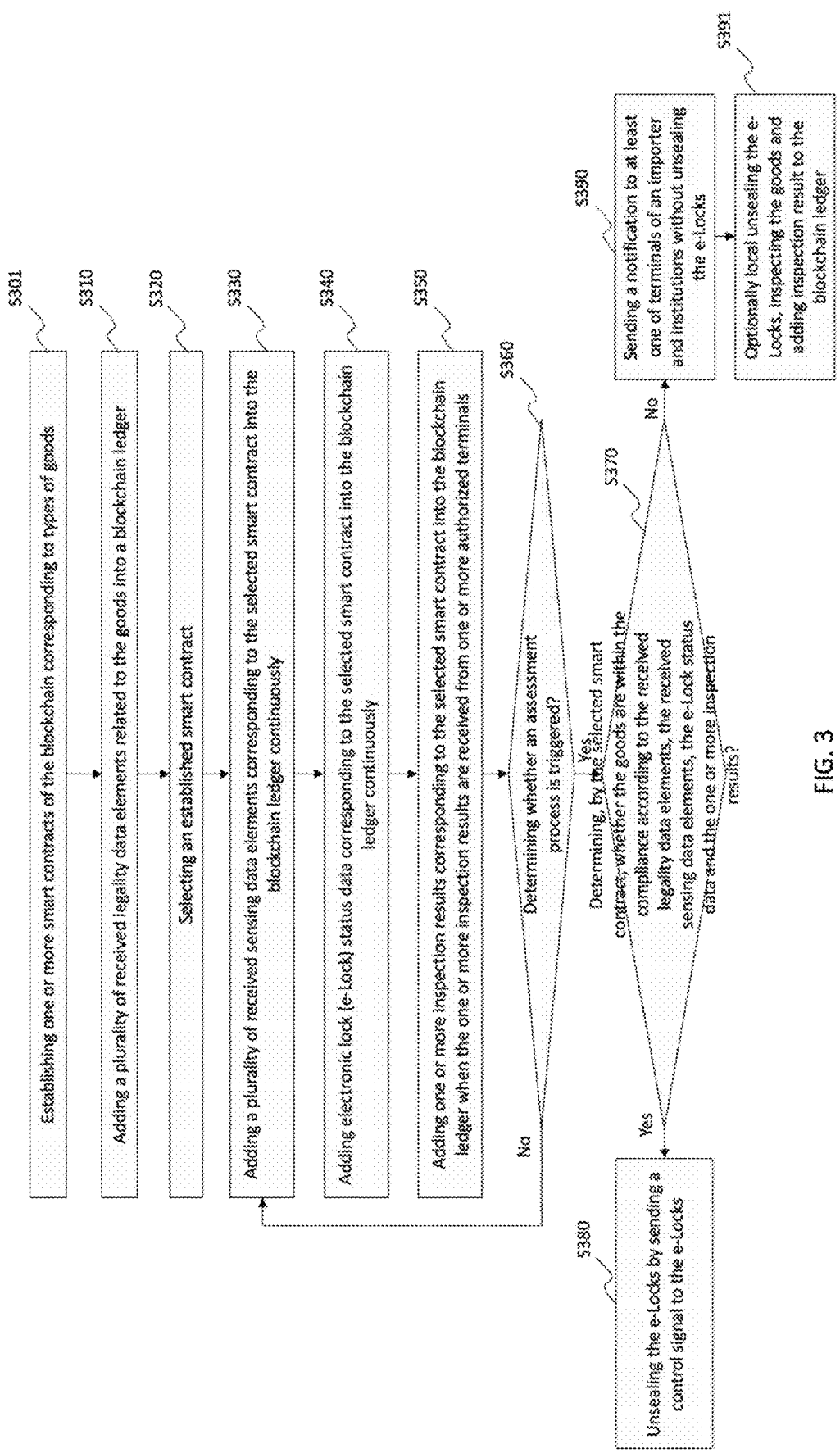
FIG. 3 depicts a flowchart of a logistic management method in accordance with one embodiment of the present invention.

Referring to FIG. 3, in step S301, the first processor 130 receives pre-defined smart contract rules extracted from user input of human-readable form such as compliance documents containing pre-defined compliance rules and parameters, and legality data elements, and establishes one or more smart contracts with each corresponding to a type of goods in the import supply chain logistics and in turn to a set of compliance rules and parameters specific to that type of goods. For example, the types of goods may be frozen food, perishable produce, live seafood, etc. Each smart contract may then contain one or more of first criteria, second criteria, and authorized identifications. The compliance rules may contain one or more logic such as thresholds on temperatures, air-pressures, etc. and documentation requirements for comparing against target measurements and conditions. For example, a logic may be: "Temperature <8" (The temperature measured must be lower than 8 degrees Celsius) (e.g., the first criterion); and "Existence of health certificate=true" (The Health Certificate must exist in the blockchain) (e.g., the second criterion).

Figure 5:
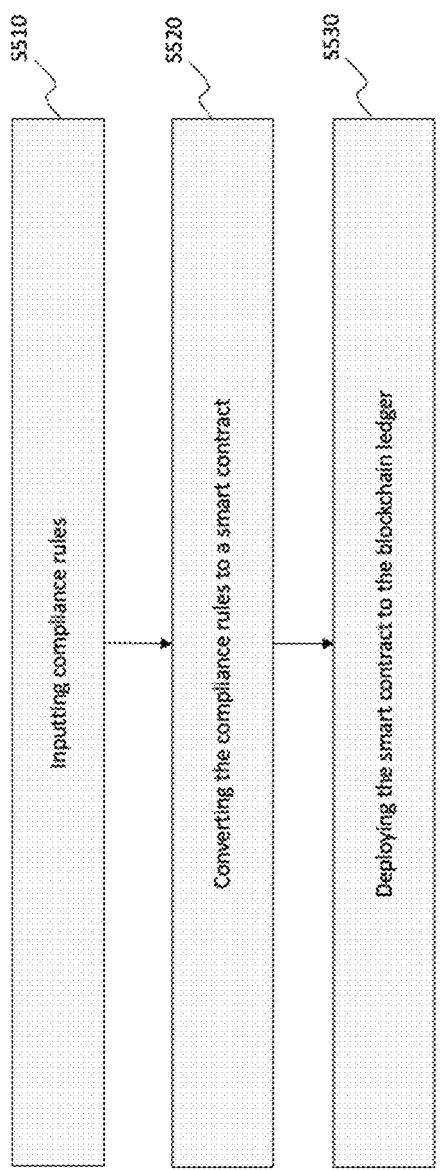
FIG. 5 depicts a flowchart of establishing a smart contract under the logistic management method.

Referring to FIG. 5, in step S510, the first processor 130 inputs one or more of the extracted pre-defined smart contract rules into a smart contract generation and deployment module. Next, in step S520, the smart contract generation and deployment module transforms the extracted pre-defined smart contract rules to a smart contract corresponding to the blockchain ledger. Next, in step S530, the first processor 130 deploys the smart contract to the blockchain ledger.

In more details, the establishment of a smart contract comprises:

Step (1): Extracting, by the first processor 130, from the received human-readable-form compliance documents containing pre-defined compliance rules and parameters, and legality data elements one or more smart contract rules. The compliance rules and parameters in the compliance documents are pre-defined based on the different types of goods and legality data elements.

Step (2): Selecting one or more target sensing data elements among all types of the sensing data elements according to the compliance rules and parameters extracted from the compliance documents and the legality data elements. For example, for the type of goods being perishable foods, and as such the same should be stored and delivered under a cool-chain logistic based on the identified specific rules/conditions or values of the legality data elements, the first processor 130 should select particular types of sensing data elements related to the cool-chain logistic, such as "real-time goods temperature" and "real-time container internal temperature". In one embodiment where there are relative straightforward relationships between the types of goods and their corresponding compliance rules and parameters and that the requirements on the types of the sensing data elements corresponding to the compliance rules and parameters are also relatively straightforward, Step (2) may be executed automatically by the first processor 130. In another embodiment where the relationships between the types of goods and their corresponding compliance rules and parameters are relative complex or that the requirements on the types of the sensing data elements corresponding to the compliance rules and parameters are relatively complex, Step (2) may be executed by human operators.

Step (3): Setting one or more first criteria according to the legality data elements and the one or more target sensing data elements; wherein the first criteria include at least one or more predefined ranges corresponding to one or more of the sensing data elements, and one or more predefined thresholds corresponding to one or more of the sensing data elements. For example, the first processor 130 may set, according to the identified specific rules/conditions of the legality data elements and the one or more target sensing data elements, the first criteria as "a predefined range for the real-time goods temperature or the real-time container interior temperature" or "a predefined threshold for the real-time goods temperature data or the real-time container interior temperature" (which can be converted from the corresponding compliance rules) to the smart contract (e.g., for the cool-chain logistic scenario mentioned above, the smart contract will correspondingly monitor the temperature of the goods or the inner space of the containers by the first criteria).

Step (4): Setting one or more second criteria; wherein the second criteria may include at least one of: (1) first requirements about one or more predefined legality data elements corresponding to the goods; (2) second requirements about one or more predefined e-Lock operations; (3) third requirements about one or more predefined inspections; (4) fourth requirements of one or more predefined transportation routes; and (5) fifth requirements of one or more predefined period corresponding to the one or more predefined transportation routes. The first criteria are used for monitoring the condition of the goods or/and the surrounding environment of the goods, and the second criteria is used to set rules for checking the corresponding compliance.

Step (5): Setting one or more authorized identifications for adding data into the blockchain ledger. The authorized identification is used by the first processor 130 to identify the legal data sent from a terminal to generate the corresponding transactions for the smart contract of the blockchain ledger, or to identify the received auxiliary data (which may be used to affect the determination of the compliance) having one or more of the authorized identifications from one or more terminals.

Next, in step S310, the first processor 130 adds one or more received legality data elements related to the goods as one or more blocks into a blockchain ledger; wherein the legality data elements include at least one of following types: (1) data related to one or more specifications of the goods; (2) data related to one or more documents of production history corresponding to the goods; (3) data related to one or more documents of verification processes (e.g., Health Certificates) corresponding to the goods; and (4) data related to one or more documents of import-authorization processes (e.g., Import Licenses) for the goods. For example, as illustrated in FIG. 1A, assuming that user U1 is an importer of the goods, his/her terminal device TM1 may send some legality data element LD (e.g., type (1) and type (2) of the legality data elements) to management server 100. Furthermore, assuming that user U2 is an institution for verifying the quality of the goods or a custom, his/her terminal device may send other legality data element LD (e.g., type (3) or type (4) of the legality data elements) to the management server 100. The first processor 130 of the management server 100 then adds all these received legality data elements as one or more blocks into the blockchain ledger.

Next, in step S320, the first processor 130 selects an established smart contract based on the type of the goods determined from the received legality data elements.

Next, in step S330, the first processor 130 adds the received sensing data elements corresponding to the smart contract into the blockchain ledger continuously. Here, the term "continuously" means whenever the first processor 130 receives a sensing data element, it may add this sensing data element into the blockchain ledger in real-time without concerning whether the receiving time is within a particular period (e.g., an office hour of a particular institution). Furthermore, the sensing data elements may be continuously (e.g., with predefined interval) sent from sensors 240 or containers 200 to the management server 100.

Figure 4A:
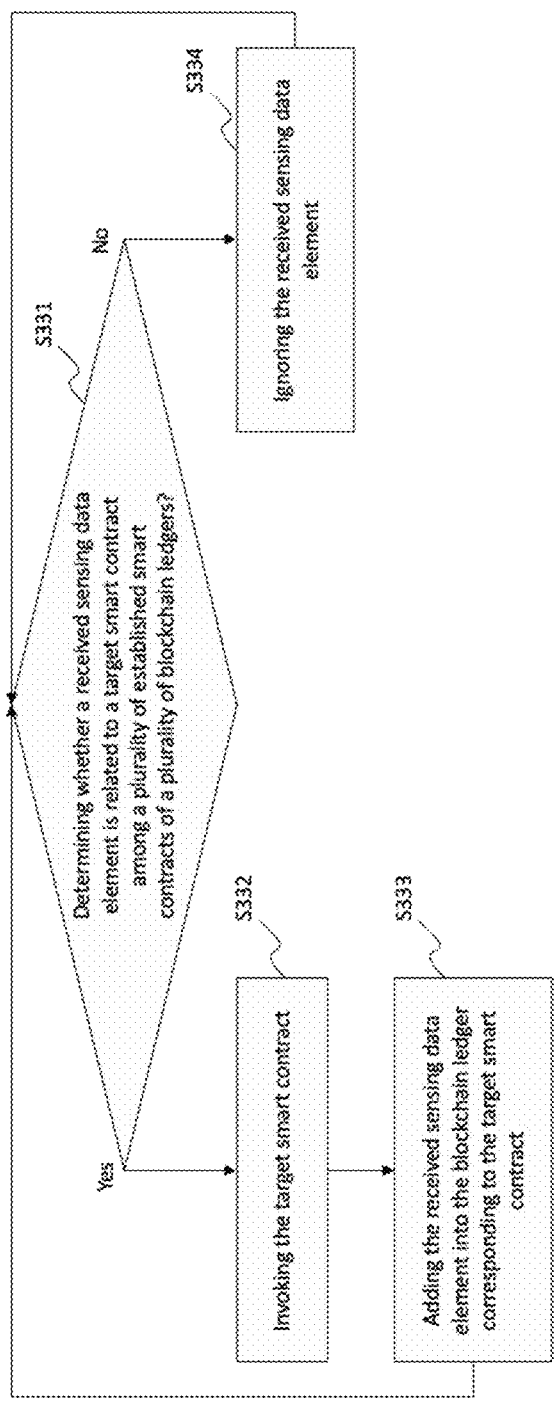
FIG. 4A depicts a flowchart of step S330 illustrated in FIG. 3.

Referring to FIG. 4A, in one embodiment, step S330 includes steps S331 to S334. In step S331, the first processor 130 determines whether a received sensing data element is related to a target smart contract among the established smart contracts. If the received sensing data element is related to the target smart contract, continues to step S332, the first processor 130 invokes the target smart contract. In step S333, the first processor 130 adds the received sensing data element into the blockchain ledger corresponding to the target smart contract. The first processor 130 then repeats from step S331 for the next received data element. Otherwise, if the received sensing data element is not related to the target smart contract, the received sensing data element is ignored. The first processor 130 then repeats from step S331 for the next received data element.

In another embodiment, the invoked smart contract may directly check whether the received sensing data element violates a related first criterion of the target smart contract.

Figure 4B:
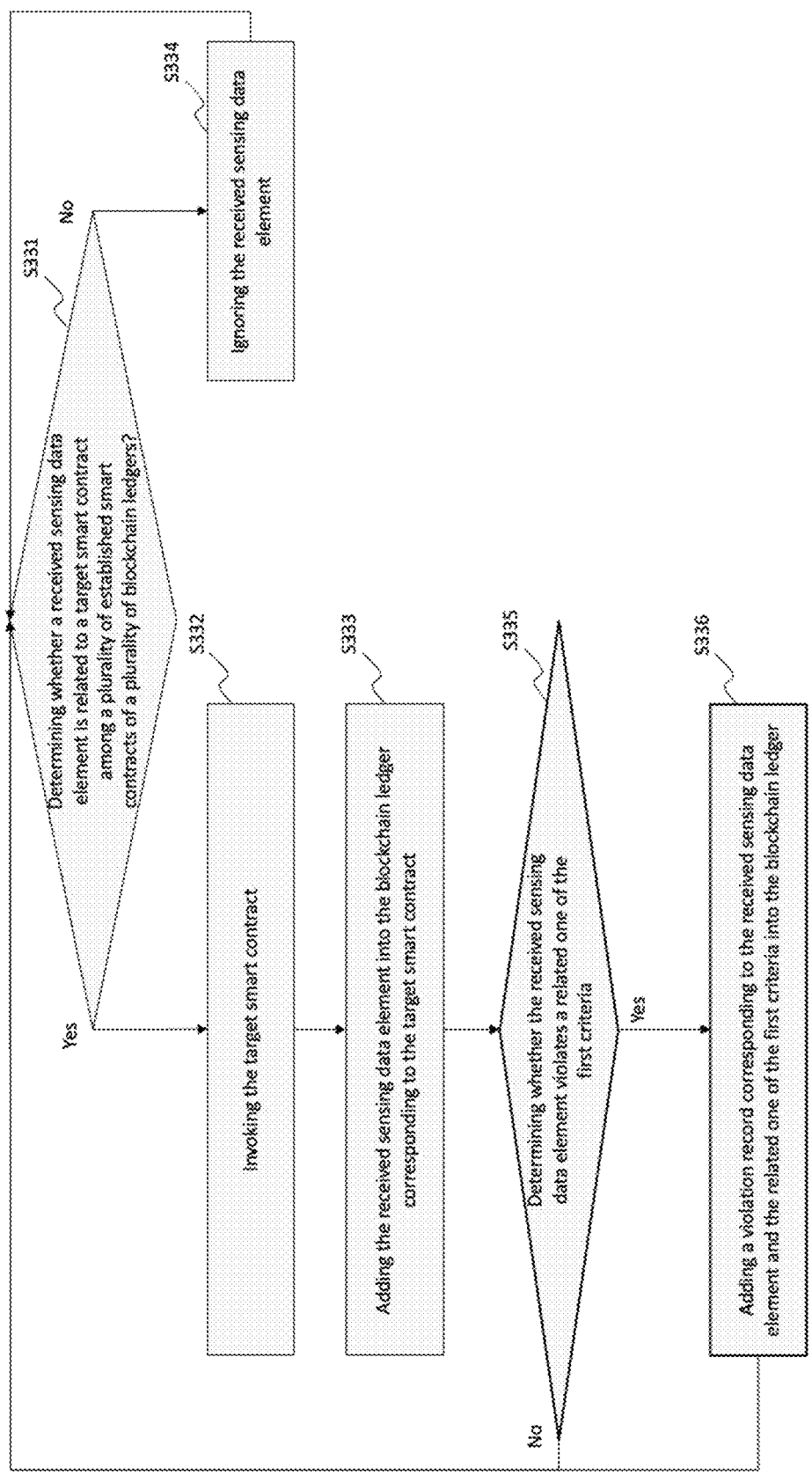
FIG. 4B depicts a further flowchart of step S330 illustrated in FIG. 3.

Referring to FIG. 4B, in another embodiment, the details of steps S331 to S334 are substantially the same as those in steps S331 to S334 as shown in FIG. 4A. In step S335, the first processor 130 (executing the smart contract) further determines whether the received sensing data element violates any one of related first criteria. More specifically, the first processor 130 (executing the smart contract) retrieves a target range or a target threshold from the first criteria corresponding to the received sensing data element; then, determines whether a value of the sensing data of the received sensing data element is within the target range or the target threshold. Finally, if a value of the sensing data of the received sensing data element is not within the target range or the target threshold, the first processor 130 (executing the smart contract) determines that the received sensing data element violates the related first criteria. In this case, in step S336, the first processor 130 adds a violation record having, for example, the value of "assetType" being set to "violatedTemp," corresponding to the received sensing data element and the related first criteria into the blockchain ledger. In short, the nature of a violation record is not different from that of any other record being stored in the blockchain ledger. In one embodiment, a violation record is separately stored for rapid access. The first processor 130 then repeats from step S331 for the next received data element. Otherwise, if the received sensing data element does not violate the related one of the first criteria, the first processor 130 repeats from step S331 for the next received data element.

Back to FIG. 3, in step S340, the first processor 130 adds electronic lock (e-Lock) status data corresponding to the smart contract into the blockchain ledger continuously. Here, the term of "continuously" means whenever the first processor 130 receives an e-Lock status data, it may add this e-Lock status data into the blockchain ledger in real-time without concerning whether the receiving time is within a particular period. Furthermore, the e-Lock status data may be continuously (e.g., with predefined interval) sent from e-Locks 250 or containers 200 to the management server 100. In one embodiment the first processor 130 may add the e-Lock status data into the corresponding blockchain ledger by finding a target smart contract corresponding to the received e-Lock status data, similar to the operations in S331 to S334.

Next, in step S350, the first processor 130 adds one or more inspection results corresponding to the smart contract into the blockchain ledger when the one or more inspection results are received from one or more authorized terminals. More specifically, as illustrated in FIG. 1A, when a predefined inspection, which can be executed by inspector U3 for example, applied to the goods is finished, the corresponding inspection result IR may be sent to management server 100 from inspector's terminal device TM3. If the terminal device TM3 is determined as an authorized terminal corresponding to the predefined inspection by the first processor 130, the first processor 130 may add this inspection result into the blockchain ledger.

Next, in step S360, the first processor 130 (executing the smart contract) determines whether an assessment process is triggered. For example, when the first processor 130 determines that the goods/containers arrive a corresponding destination, or the current time and date of the goods/container matches a predefined deadline, the first processor 130 (executing the smart contract) may determine that the assessment process is triggered, and proceeds to step S370; otherwise, the process loops back to step S330. The trigger condition(s) of the assessment process may be captured by the smart contract when establishing the smart contract.

Next, in step S370, the first processor 130 determines, by the smart contract, whether the goods are within the compliance according to the received legality data elements, the received sensing data elements, the e-Lock status data and the one or more inspection results.

More specifically, the goods are determined to be not within the compliance when at least one of following conditions (a) to (c) occurred:

Condition (a): one or more of the first criteria are violated. For example, when the first processor 130 (or a smart contract) detects that the blockchain ledger has at least one violation record, at least one of the first criteria is violated; or when first processor 130 determines that one or more of the first criteria are violated from the comparison of the sensing data elements with the corresponding first criteria.

Condition (b): one or more of the second criteria are violated.

Condition (c): one or more auxiliary data indicate that the compliance is violated, wherein the auxiliary data are added into the blockchain ledger when the auxiliary data having one or more of the authorized identifications is received from one or more control terminals (e.g., of an importer, exporter, custom, or other government institution that has the authority to stop the logistic of the goods).

At least one of the second criteria is violated when at least one of following conditions (1) to (5) occurs:

Condition (1): one or more of the received legality data elements do not fulfill the first requirement. For example, when the first processor 130 (executing the smart contract) determines, based on the received legality data elements, that a particular value in the data related to one specification of the goods (one type of the legality data element) is not within an allowed range of a corresponding first requirement; a particular value in the data related to one document of production history corresponding to the goods exceeds an allowed threshold; the received legality data elements does not contain data related to one particular document of the verification process corresponding to the goods (e.g., the type of required document does not match); the received legality data elements does not contain data related two predefined documents of the import-authorization processes (e.g., the total amount of required import-authorization documents does not match); or the pattern of electronic signature of a particular field of the data related to one document of the import-authorization processes for the goods does not match the pattern of a predefined electronic signature.

Condition (2): one or more of the received e-Lock status data do not fulfil the second requirement. For example, when the first processor 130 (executing the smart contract) determines, based on the received e-Lock status data, that the location at which a particular e-Lock is unsealed is not one of predefined locations; the total amount of sealed e-Locks is not matching a predefined amount; or a particular e-Lock is unseal under an unauthorized operation even the corresponding location is one of the predefined locations.

Condition (3): one or more of the inspection results do not fulfil the third requirement. For example, when the first processor 130 (executing the smart contract) determines that a received inspection result indicates that the condition of the goods does not pass the requirement of the inspection.

Condition (4): a recorded transportation route for the goods does not fulfil the fourth requirement, wherein the recorded transportation route is generated according to the locations of the goods at different time identified from the sensing data elements. For example, when the first processor 130 (executing the smart contract) determines that the recorded transportation route substantially deviates from a predefined transportation route; or a maximum bias distance between the recorded transportation route and the predefined transportation route is larger than a predefined threshold.

Condition (5): a recorded transportation period corresponding to the goods does not fulfil the fourth requirement. The recorded transportation period is generated according to time data identified from the sensing data elements. For example, when the first processor 130 (executing the smart contract) determines that the recorded transportation period is longer than a predefined period corresponding to the predefined transportation route, and the exceeding time is over a predefined tolerance time.

If the goods are within the compliance, in step S380, the first processor 130 (executing the smart contract) may unseal the e-Locks by sending a control signal to the e-Locks. For example, the first processor 130 may send a control signal or a unseal request to all the containers 200, and the second processor 230 may instruct the e-Locks 250 to perform the unseal operation (or the e-Locks can directly perform the unseal operation themselves by the received control signal or the unseal request). The first processor 130 may further send a notification for informing that the goods are within the compliance to the related terminal devices of the importer and the related institutions.

Otherwise, if the goods are not within the compliance, in step S390, the first processor 130 (executing the smart contract) may send a notification to at least one of the terminals of the importer and the related institutions without unsealing the e-Locks. Optionally in set S391, IN2 (e.g., Food and Environmental Hygiene Department (FEHD)) may locally cause to unseal the e-Locks, inspect the goods, and add the inspection result to the blockchain ledger.

Figure 6:
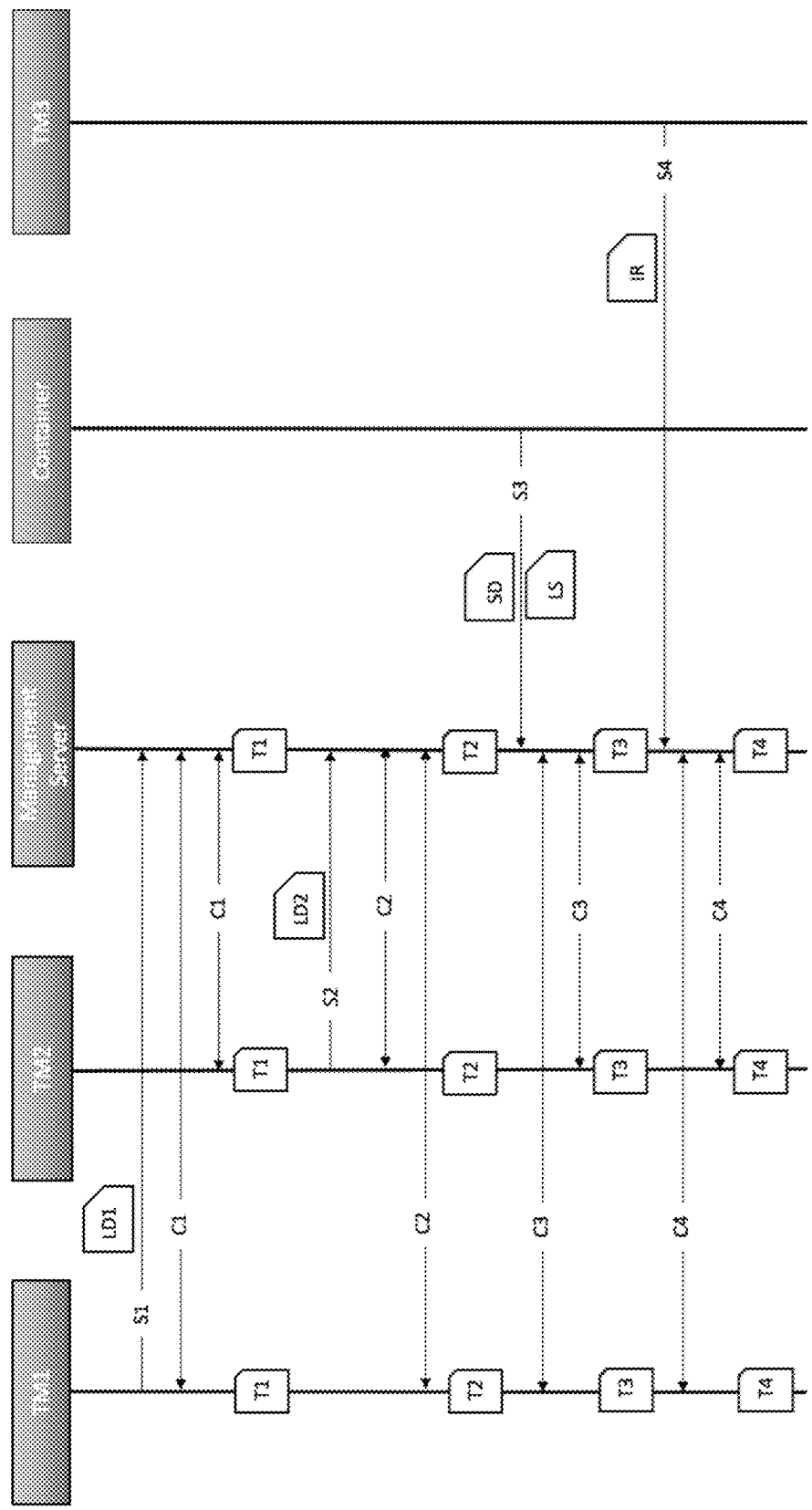
FIG. 6 depicts a schematic diagram illustrating the operation flows for adding data into a blockchain ledger maintained by multiple devices via concepts of consensus and peer-to-peer under the logistic management method.

Referring to FIG. 6 for the following description. After receiving legality data element LD1 from terminal device TM1 (flow S1), terminal devices TM1 and TM2 need to validate the legality data element LD1 with the management server (flow C1) before the management server adds this legality data element LD1 into its blockchain ledger as a new transaction T1 (under consensus concept or endorsement concept). After terminal devices TM1 and TM2 confirm the validation of the legality data element LD1, the management server and the terminal devices TM1 and TM2 add the new transaction T1 into their copies of the blockchain ledger.

Similarly, after receiving legality data element LD2 from terminal device TM2 (flow S2), terminal devices TM1 and TM2 need to validate the legality data element LD2 with the management server (flow C2) before the management server adds this legality data element LD2 into its blockchain ledger as a new transaction T2. After terminal devices TM1 and TM2 confirm the validation of the legality data element LD2, the management server and the terminal devices TM1 and TM2 add the new transaction T2 into their copies of the blockchain ledger.

Also, after receiving sensing data element SD from container (flow S3), terminal devices TM1 and TM2 need to validate the sensing data element SD with the management server (flow C3) before the management server adding this sensing data element SD into its blockchain ledger as a new transaction T3. After terminal devices TM1 and TM2 confirm the validation of the sensing data element SD, the management server and the terminal devices TM1 and TM2 add the new transaction T3 into their copies of the blockchain ledger.

Furthermore, after receiving inspection result IR from terminal device TM3 (flow S4), terminal devices TM1 and TM2 need validate the inspection result IR with the management server (flow C4) before the management server 100 adding this inspection result IR into its blockchain ledger as a new transaction T4. After terminal devices TM1 and TM2 confirm the validation of the inspection result IR, the management server 100 and the terminal devices TM1 and TM2 add the new transaction T4 into their copies of the blockchain ledger.

Figure 7:
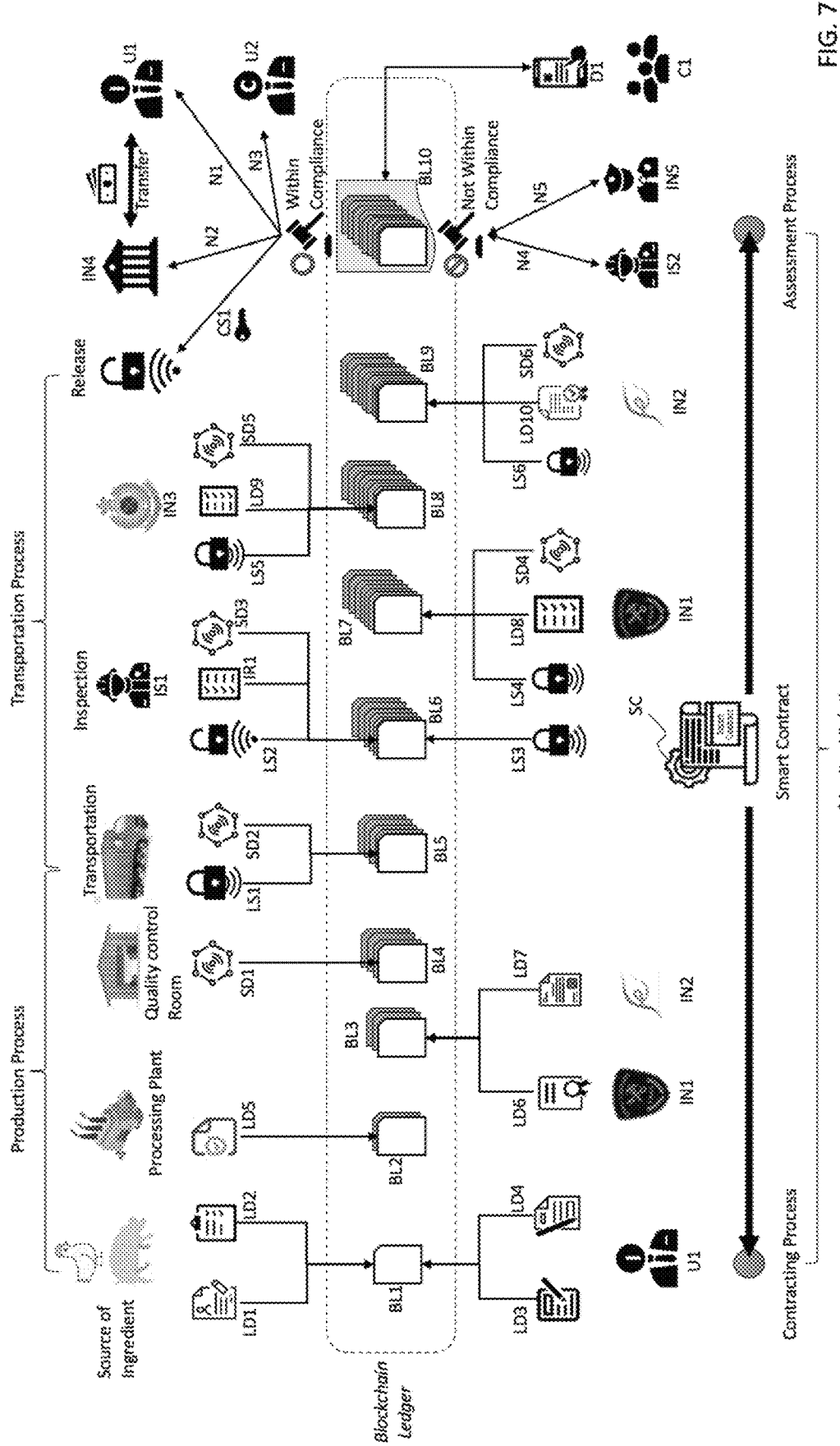
FIG. 7 depicts a schematic diagram illustrating the operations of the logistic management system.

Referring to FIG. 7 for the following description of an exemplary implementation of the present invention. Firstly, the management server 100 of the logistic management system 1 adds legality data elements LD1 and LD2 received from source of the ingredient (e.g., a farm) of the goods (e.g., food products) and legality data elements LD3 and LD4 received from user U1 (e.g., an importer) into a corresponding blockchain ledger to form blockchain BL1 (during the production process of the goods). At this point, the management server 100 establishes a smart contract corresponding to the goods import logistic after adding the legality data elements LD1 to LD4 (e.g., the contracting process). The conditions/rules of the compliance may also be set during the contracting process. After the smart contract is established, the smart contract starts to monitor violation.

Then, the ingredients are transferred to the processing plant for processing into the food products, and the processing plant may send legality data element LD5 to the management server 100, such that the management server 100 may update blockchain ledger BL1 to blockchain ledger BL2 by adding to BL1 the received legality data element LD5.

Furthermore, related institution IN1 (e.g., China Customs) and IN2 (e.g., FEHD) respectively send legality data elements LD6 and LD7 to the management server 100, such that the management server 100 may update the blockchain ledger BL2 to blockchain ledger BL3 by adding to BL2 the received legality data elements LD6 and LD7.

Then, the food products are transferred to the quality control room (e.g., the chiller room) for preparation for transportation. For example, the food products are stored in the smart containers 200 having freezers (not shown). The sensors 240 installed on the containers 200 may generate corresponding sensing data (e.g., real-time temperature data and location information data), and the second processor 230 of the containers 200 may generate and send corresponding sensing data element SD1 to the management server 100, such that the management server 100 may update blockchain ledger BL3 to blockchain ledger BL4 by adding to BL3 the received sensing data element SD1.

Then, the transportation of the containers containing the food products begins by loading the containers on to vehicles (e.g., cargo trucks) after sealing all the e-Locks 250 of containers 200. The sensors 240 installed on the containers 200 may generate corresponding sensing data (e.g., real-time temperature data), and the second processor 230 of the containers 200 may generate and send the corresponding sensing data element SD2 to the management server 100, such that the management server 100 may update blockchain ledger BL4 to blockchain ledger BL5 by adding to BL4 the received sensing data element SD2.

Certain predefined inspections of the goods are scheduled during the transportation process. For example, an authorized inspector IS1 may perform an inspection on the goods by unsealing the e-Locks 250 of the containers with his/her handheld device (or a terminal device). The e-Locks 250 may generate e-Lock status data LS2 indicating the current unsealing operations of the e-Locks 250, and the second processor 230 may send the e-Lock status data LS2 to management server 100. After the inspection is finished, the e-Locks 250 are all re-sealed, and the e-Locks 250 may generate e-Lock status data LS3 indicating the current sealing operations of the e-Locks 250, and the second processor 230 may send the e-Lock status data LS3 to the management server 100. Furthermore, an inspection result IR1 is generated and sent by the terminal device of inspector IS1. Meanwhile, the sensors 240 keep generating the corresponding sensing data (e.g., real-time temperature data), and the second processor 230 of the containers 200 may correspondingly generate and send sensing data elements SD3 to the management server 100. The blockchain ledger BL5 is updated as blockchain ledger BL6 by adding to BL5 the received e-Lock status data LS2, e-Lock status data LS3, inspection result IR1 and sensing data elements SD3.

Then, when the goods are crossing border, institution IN1 (e.g., China Customs), may verify the transportation of the goods and provide legality data element LD8 to management server 100. Meanwhile, e-Lock status data LS4 and sensing data elements SD4 are continuously sent to the management server 100. The management server 100 may update the blockchain ledger BL6 to blockchain ledger BL7 by adding the legality data element LD8, the e-Lock status data LS4 and the sensing data elements SD4 as a new block. Furthermore, institution IN3 (e.g., Hong Kong Customs), may also verify the transportation of the goods and provide legality data element LD9 to management server 100. Meanwhile, e-Lock status data LS5 and sensing data elements SD5 are continuously sent to the management server 100. The management server 100 may update the blockchain ledger BL7 to blockchain ledger BL8 by adding the legality data element LD9, the e-Lock status data LS5 and the sensing data elements SD5 as a new block. Besides, institution IN2 (e.g., China Customs), may verify the quality of the goods and provide legality data element LD10 to management server 100. Meanwhile, e-Lock status data LS6 the sensing data elements SD6 are continuously sent to the management server 100. The management server 100 may update the blockchain ledger BL8 to blockchain ledger BL9 by adding to BL8 the legality data element LD10, the e-Lock status data LS6 and the sensing data elements SD6.

Then, when the goods arrive at a predefined destination, the first processor 130 (executing the smart contract) may detect this fact by identifying the location information data of the containers from one of the received sensing data elements, and the first processor 130 (executing the smart contract) may determine that the execution condition of an assessment process is triggered, and determine whether the goods are within the compliance according to the received legality data elements (e.g., LD1 to LD10), the received sensing data elements (e.g., SD1 to SD6), the e-Lock status data (e.g., LS1 to LS6), and the one or more inspection results (e.g., IR1). The result of the determination of the compliance may be added as a new block to update the blockchain ledger BL9 to the blockchain ledger BL10.

If the goods are within the compliance, the first processor 130 may send a control signal CS1 for unsealing the e-Locks 250. Furthermore, the first processor 130 may send notification signals N1 to N3 respectively to terminal devices of the institution IN4 (e.g., a bank), user U1 (e.g., the importer), user U2 (e.g., the client), such that, for example, a money transfer can be automatically executed therebetween.

If the goods are not within the compliance, the first processor 130 may send notification signals N4 to N5 respectively to terminal devices of the inspector IS2 and institution IN5 (e.g., related government institution having the authority to inspect the goods or withhold the goods), such that the goods can be e.g., held for re-inspection.

The customers C1 may easily review the whole history (e.g., all recorded transactions) of the blockchain ledger BL10 by using their device D1, such that, in this way, the entire logistics process can also be open and transparent to the public or customers.

Lastly, the first processor 130 (executing the smart contract) may check the logistic history of the importer, farms, or the processing plant. If the logistic history is corrupted or incomplete, the first processor 130 (executing the smart contract) may determine that the goods are not within the compliance. The first processor 130 (executing the smart contract) may further check whether the types of the goods are high-risk (e.g., by checking against regulatory control lists on ingredients); and if so determined to be not within the compliance.

Based on the embodiments described above, the provided logistic management system and method are capable of continuously adding related data (e.g., the legality data elements, the sensing data elements and the inspection results) for monitoring the completeness of the goods into a corresponding blockchain ledger, and automatically checking whether the goods are within a set compliance by the established smart contract of the blockchain ledger, such that besides the safety and the quality of the goods can be monitored automatically and continuously, the correctness of every added data/transaction is ensured, the added transaction is hard to be tampered with, and the determination of the compliance made by the smart contract of the blockchain ledger would be reliable and credible. Therefore, by applying the logistic management system and method provided by the embodiments, the entire efficiency, performance, reliability and credibility of the logistic management are much increased.

It should be noted that, although the embodiments are taking an import logistic as the examples, the provided logistic management and method can be applied on other kinds of the logistic systems, e.g., the export logistic system or the logistic system within the border.

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Machine instructions or firmware/software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include non-transient memory circuits and/or computer storage media having machine instructions or firmware/software codes stored therein which can be used to program the processors to perform any of the processes of the present invention. The non-transient memory circuits and/or storage media include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium. The communication networks established in the various embodiments support various communication protocols such as, without limitation, Wi-Fi, the Global System for Mobile Communication (GSM) system, the Personal Handy-phone System (PHS), Code Division Multiple Access (CDMA) system, Worldwide Interoperability for Microwave Access (WiMAX) system, third-generation wireless communication technology (3G), fourth-generation wireless communication technology (4G), fifth-generation wireless communication technology (5G), Long-term Evolution technology (LTE), Bluetooth, and Ultra-Wideband (UWB).

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implemented method for checking a compliance related to goods in import supply chain logistics, comprising:
   adding one or more received legality data elements related to the goods into a blockchain ledger corresponding to an importation of the goods, wherein the legality data elements are sent from one or more terminals of an importer or one or more import-related institutions;
   selecting a smart contract among one or more established smart contracts based on type of the goods, wherein each of the established smart contracts is associated with a type of goods;
   adding one or more received sensing data elements corresponding to the selected smart contract into the blockchain ledger continuously, wherein the sensing data elements are generated by one or more the sensors installed at one or more of the containers containing the goods;
   adding electronic lock (e-Lock) status data corresponding to the selected smart contract into the blockchain ledger continuously, wherein the e-Lock status data is generated by e-Locks installed at the containers containing the goods;
   adding one or more inspection results corresponding to the selected smart contract into the blockchain ledger when the inspection results are received from one or more authorized terminals;

in response to triggering an execution condition of an assessment process, determining, by the selected smart contract, whether the goods are within the compliance according to the received legality data elements, the received sensing data elements, the e-Lock status data, and the inspection results;

in response to the goods being within the compliance, unsealing the e-Locks by sending a control signal to the e-Locks.

2. The method of claim 1, wherein the legality data elements comprise at least one of following types:
   data related to one or more specifications of the goods;
   data related to one or more documents of production history corresponding to the goods;
   data related to one or more documents of verification processes corresponding to the goods; and
   data related to one or more documents of import-authorization processes for the goods.

3. The method of claim 1, wherein the sensing data elements comprises at least one of following types:
   real-time goods temperature;
   real-time goods weight;
   real-time container internal pressure;
   real-time container internal humidity;
   real-time container location;
   real-time container internal luminance;
   real-time container interior temperature;
   real-time container acceleration; and
   real-time container vibration.

4. The method of claim 1, wherein a data structure of each of the sensing data elements comprises:
   a first field, configured to record identification information of a corresponding sensing data element;
   a second field, configured to record identification information of a logistic license corresponding to the goods, wherein the identification information of the license number is used for tracking a smart contract to which the corresponding sensing data element is related to;
   a third field, configured to record sensing time of a sensing operation performed by a sensor of the corresponding sensing data element; and
   a fourth field, configured to record a sensing data generated by the sensor via the performed sensing operation.

5. The method of claim 1, wherein the adding of the received sensing data elements corresponding to the selected smart contract into the blockchain ledger comprises:
   determining whether a received sensing data element is related to a selected smart contract among the established smart contracts;
   if the received sensing data element is related to the selected smart contract, invoking the selected smart contract and adding the received sensing data element into the blockchain ledger corresponding to the selected smart contract; and
   else if the received sensing data element is not related to any of the established smart contracts, ignoring the received sensing data element.

6. The method of claim 1, the establishment of the smart contract comprises:
   receiving one or more smart contract rules;
   transforming the smart contract rules to a smart contract corresponding to the blockchain ledger, wherein the smart contract contains one or more first criteria, one or more second criteria and one or more authorized identifications; and
   deploying the smart contract to the blockchain ledger.

7. The method of claim 6, further comprising:
   after adding the received sensing data element into the blockchain ledger corresponding to the smart contract, determining whether the received sensing data element violates one or more of the first criteria;
   if the received sensing data element violates one or more of the first criteria, adding a violation record corresponding to the received sensing data element and the violated first criteria into the blockchain ledger.

8. The method of claim 1, wherein the e-Lock status data structure comprises one or more of following fields:
   a first field, configured to record identification information of e-Locks corresponding to the e-Lock status data;
   a second field, configured to record whether a seal state or an unseal state under which the e-Locks currently are;
   a third field, configured to record current local time of the e-Locks;
   a forth field, configured to record identification information of a smart contract to which the e-Lock status data is related;
   a fifth field, configured to record a legality of the seal state or the unseal state of the second field; and
   a sixth field, configured to record location information of the e-Locks.

9. The method of claim 7, wherein the first criteria comprise at least one of following:
   one or more predefined ranges corresponding to one or more of the sensing data elements; and
   one or more predefined thresholds corresponding to one or more of the sensing data elements,
   wherein the determination of whether the received sensing data element violates one or more of the first criteria comprises:
      identifying a target range or a target threshold from one of the first criteria corresponding to the received sensing data element;
      determining whether a value of the sensing data of the received sensing data element is within the target range or the target threshold; and
      if the value of the sensing data of the received sensing data element is not within the target range or the target threshold, determining that the received sensing data element violates at least one of the first criteria.

10. The method of claim 7, wherein the second criteria comprise at least one of following requirements:
    first requirements about one or more predefined legality data elements corresponding to the goods;
    second requirements about one or more predefined e-Lock operations;
    third requirements about one or more predefined inspections;
    fourth requirements of one or more predefined transportation routes; and
    fifth requirements of one or more predefined period corresponding to the one or more predefined transportation routes,
    wherein one of the second criteria is determined being violated when at least one of following conditions is occurred:
       one or more of the received legality data elements do not fulfill the first requirement;
       one or more of the received e-Lock status data do not fulfil the second requirement;
       one or more of the inspection results do not fulfil the third requirement;

a recorded transportation route corresponding the goods does not fulfil the fourth requirement, wherein the recorded transportation route is generated according to one or more locations of the goods at different time identified from the sensing data elements; and a recorded transportation period corresponding the goods does not fulfil the fourth requirement, wherein the recorded transportation period is generated according to time data identified from the sensing data elements.

11. The method of claim 1, wherein the goods are determined not within the compliance when at least one of following conditions occurred:

one or more of the first criteria are violated;

one or more of the second criteria are violated; and one or more auxiliary data indicates that the compliance is violated, wherein the one or more auxiliary data are added into the blockchain ledger when the one or more auxiliary data having one or more of the authorized identifications is received from one or more control terminals.

12. A logistic management system using blockchain for checking a compliance related to goods in import supply chain logistics, comprising:

a management server having a first processor configured to manage one or more blockchain ledgers; and one or more containers, each of the containers comprises:
one or more sensors, installed at the container;
one or more electronic locks (e-Locks), installed at one or more doors of the container, and configured to seal the doors; and
a second processor, configured to control the sensors and the e-Locks;

wherein the first processor is further configured to executes a computer-implemented method, the method comprising:

adding one or more received legality data elements related to the goods into a blockchain ledger corresponding to an importation of the goods, wherein the legality data elements are sent from one or more terminals of an importer or one or more import-related institutions;

selecting a smart contract among one or more established smart contracts based on type of the goods, wherein each of the established smart contracts is associated with a type of goods;

adding one or more received sensing data elements corresponding to the selected smart contract into the blockchain ledger continuously, wherein the sensing data elements are generated by the sensors of the containers containing the goods;

adding electronic lock (e-Lock) status data corresponding to the selected smart contract into the blockchain ledger continuously, wherein the e-Lock status data is generated by the e-Locks of the containers containing the goods;

adding one or more inspection results corresponding to the selected smart contract into the blockchain ledger when the inspection results are received from one or more authorized terminals;

in response to an execution condition of an assessment process is triggered, determining, by the selected smart contract, whether the goods are within the compliance according to the received legality data elements, the received sensing data elements, the e-Lock status data, and the inspection results;

if the goods are within the compliance, unsealing the e-Locks by sending a control signal to the e-Locks; else if the goods are not within the compliance, sending a notification to at least one of the importer and the institutions without unsealing the e-Locks.

* * * * *